(12) United States Patent
Lund (10) Patent No.: US 6,935,520 B1
(45) Date of Patent: Aug. 30, 2005

(54) RUG HOOKING WORKSTATION

(76) Inventor: Jolyn R. Lund, 145 Meadow La. North, Golden Valley, MN (US) 55422

( * ) Notice: Subject to any disclaimer, the term of this patent is extended or adjusted under 35 U.S.C. 154(b) by 37 days.

(21) Appl. No.: 10/443,900

(22) Filed: May 22, 2003

(51) Int. Cl.[7] ................................. A47F 5/14
(52) U.S. Cl. ................. 211/181.1; 211/133.5; 211/189; 211/44; 280/79.3
(58) Field of Search .............. 211/133.5, 181.1, 211/71.01, 44, 85.31, 189, 85.26, 187; 280/79.3, 280/47.41, 47.131, 47.26, 47.19, 47.27, 47.35

(56) References Cited

U.S. PATENT DOCUMENTS

| | | | |
|---|---|---|---|
| 2,772,113 A * | 11/1956 | Berard | 180/65.1 |
| 3,052,484 A | 9/1962 | Huffman et al. | |
| 3,085,694 A * | 4/1963 | Jones | 211/134 |
| 4,068,855 A * | 1/1978 | Hackett | 280/79.3 |
| 4,144,641 A | 3/1979 | Akselrad et al. | |
| 4,165,088 A * | 8/1979 | Nelson | 280/47.35 |
| 4,978,013 A | 12/1990 | Hogg | |
| 4,986,555 A * | 1/1991 | Andreen | 280/47.35 |
| 5,000,325 A | 3/1991 | D'Elia | |
| 5,213,351 A * | 5/1993 | Chen | 280/47.19 |
| 5,479,840 A | 1/1996 | Hilliard et al. | |
| 5,588,659 A | 12/1996 | Boes et al. | |
| 5,660,403 A | 8/1997 | O'Neill et al. | |
| 5,765,702 A | 6/1998 | Bustos et al. | |
| 5,887,878 A * | 3/1999 | Tisbo et al. | 280/47.19 |
| 5,947,307 A * | 9/1999 | Battaglia et al. | 211/187 |
| 6,345,829 B1 | 2/2002 | Mueller | |
| 6,347,847 B1 | 2/2002 | Tiramani et al. | |
| 6,360,797 B1 | 3/2002 | Brazell et al. | |
| 6,364,137 B1 * | 4/2002 | Glauth et al. | 211/186 |
| 6,659,294 B1 * | 12/2003 | Simard | 211/181.1 |
| 2004/0090028 A1 * | 5/2004 | Trogstam | 280/79.3 |

* cited by examiner

Primary Examiner—Jennifer E. Novosad
(74) Attorney, Agent, or Firm—Hugh D. Jaeger, Esq.

(57) ABSTRACT

A workstation (10 or 10*a*) facilitates hooking of rugs and provides storage of rug hooking supplies, tools, and equipment. The workstation (10 or 10*a*) is made up of a framework (12) with a rolling support (50) to allow mobility and a stabilizer (36) to engage a support surface. A laterally extending grab bar (56) combines with a top plate (34) to form a gap (58) adjacent to the grab bar (56) to define a handle, the handle enabling the framework (12) to be tilted rotationally about the rolling support (50) and pulled in a movement direction. The framework (12) has a storage area (18) for the rug foundation and a plurality of bins (80) attached to the framework (12) to store fabric swatches. A hook (84) is attached to some of the bins (80), and a plurality of hooks (92) are attached to the framework (12), the hooks (84) and (92) providing storage of cut fabric strips. The top plate (34) is adapted to allow the mounting of a fabric-cutting device (62 or 70) thereon and has a cutout (64) to allow access for adjusting the mounted fabric-cutting device.

15 Claims, 5 Drawing Sheets

RUG HOOKING WORKSTATION

CROSS REFERENCES TO RELATED APPLICATIONS

None.

BACKGROUND OF THE INVENTION

Field of the Invention

The present invention relates generally to the rug hooking craft, and more particularly, to a workstation to facilitate hooking of rugs and for storage of rug hooking supplies, tools, and equipment, such as rug hooking fabric swatches, cut fabric strips, a fabric-cutting device and a framed rug foundation.

The manual process of creating a rug with cut fabric strips and the like is known as hooking a rug. The essential tools, supplies, and equipment for hooking a rug are the hook, a variety of colored fabric swatches, which are cut into strips, a fabric-cutting device and the rug foundation or background with the design of the rug imprinted thereon. The rug foundation is mounted to a frame to keep the rug foundation taut for better rug hooking.

To hook a rug, the person creating the rug, also known as a rug hooker, inserts the hook into the foundation from top to bottom, and then a portion of a cut fabric strip is hooked and pulled up to the top of the rug foundation to form a loop of the desired height. The rug hooker uses this continuous technique, with the material at hand, changing colors as desired, to create a rug.

Due to the variety of colors and fabrics needed to hook a given rug, the rug hooker must keep a variety of fabric swatches readily accessible. The rug hooker also frequently stops to cut the fabric strips, and must then store cut fabric swatches into strips from each of the variety of fabric swatches. The work area can become quite cluttered, as the fabric pieces often end up strewn about, and the various swatches and cut fabric strips often end up mixed together. Being a manual craft, it is desirable for the materials, tools, and equipment to be mobile.

Therefore, there is a need to have a novel workstation to organize the rug hooking supplies, tools, and equipment and thereby facilitate the process of rug hooking. There is also a need for a novel workstation that is mobile, to enable the rug hooker to work in different places, with material readily accessible.

There is also a need for a novel workstation to organize the process of cutting the fabric swatches into strips. The fabric swatches should be readily visible and accessible in an organized fashion, in close proximity to the fabric-cutting device, with the cut fabric strips also nearby to simplify and provide orderliness to the rug hooking craft.

SUMMARY OF THE INVENTION

The present invention solves these needs and other problems in the field of rug hooking by providing, in a preferred form, a workstation to facilitate the hooking of rugs and for the storage of rug hooking fabric swatches, cut fabric strips, a fabric-cutting device, and a framed rug foundation. The workstation includes a framework having a first side, a second side, and a storage area for the framed rug foundation located between the first side and the second side. Each of the first side and the second side includes a top, a bottom, a front and a back. A plurality of bins are attached to the framework in which to store fabric swatches. A hook used to hold the cut fabric strips is attached to each of the plurality of bins. A plurality of additional hooks are attached to the framework, and the additional hooks also are used to hold the cut fabric strips. A rolling support adjacent to the backs and bottoms of the first side and the second side of the framework provides mobility on a support surface. A stabilizer is adjacent to the fronts and bottoms of the first side and the second side of the framework, the stabilizer having an inverted U shape including a central portion having opposite ends and a C-shaped foot extending from each of the opposite ends of the central portion. The central portion extends laterally between, and for a distance beyond, the first side and the second side of the framework. Each C-shaped foot includes a spine having opposite ends and a leg on each of the opposite ends of the spine. The legs are connected to the central portion, and the spines engage the support surface external to the first side and the second side of the framework. A grab bar is connected laterally between the first side and the second side of the framework interior to an intersection of a first plane formed by the tops of the first side and the second side and a second plane formed by the backs of the first side and the second side. A top plate is connected laterally between the tops of the first side and the second side of the framework and has a back edge. The back edge extends to a location intermediate the fronts and backs of the first side and the second side of the framework thereby forming a gap adjacent to the grab bar to define a handle. The handle enables the framework to be tilted rotationally about the rolling support and to be pulled in a movement direction with the backs of the first and second sides located ahead of the fronts of the first and second sides in the movement direction. The top plate is adapted to allow the mounting of the fabric-cutting device.

Another aspect of the present invention involves the bins being arranged in pairs positioned side-by-side, with a first set of side-by-side pairs of bins attached to the framework on the first side and external to the storage area and with a second set of side-by-side bins attached to the framework on the second side and external to the storage area, the storage area being intermediate the first and second sets of side-by-side pairs of bins. A hook is attached to each bin of the first and second sets of bins and protrudes at an upwardly inclined angle external to the respective bin to hold the cut fabric strips. This other aspect of the present invention also provides sets of hooks attached to the framework, with the sets of hooks attached to crossbars which are attached to the fronts of the first and second sides of the framework. The hooks are exterior to the storage area and used to hold the cut fabric strips in a readily visible and accessible manner. The workstation has a top plate extending between the tops of the first and second sides of the framework. The top plate is adapted to allow the mounting of the fabric-cutting device. A grab bar and the backs of the first and second sides define an access opening to the storage area located between the first and second sides for storing and retrieving the framed rug foundation. The first and second sets of bins provide readily accessible and visible storage of the fabric swatches in proximity to the fabric-cutting device, with the hooks on the bins and on the framework being used to hold the cut fabric strips in proximity to the fabric-cutting device and to the fabric swatches stored in the first and second sets of bins, to provide orderliness.

It is thus an object of the present invention to provide a novel workstation to organize the variety of rug hooking supplies, tools, and equipment in a convenient and orderly manner.

It is yet another object of the present invention to provide such a novel workstation that provides proximity of the fabric swatches, the fabric-cutting device, and the cut fabric strips for efficient rug hooking.

It is yet another object of the present invention to provide mobility of such a novel workstation to allow the rug hooker to work at any location with supplies, tools, and equipment readily available.

These and further objects and advantages of the present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of one working in the art after the following description has been read and understood. Further, the exact dimensions and dimensional proportions to conform to specific force, weight, strength and similar requirements will likewise be within the skill of one working in the art after the following description has been read and understood.

Where used in the various figures of the drawings, the same numerals designate the same or similar parts. Furthermore, when the terms "side," "end," "top," "bottom," "front," "back," "first," "second," "base," "laterally," and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE PREFERRED EMBODIMENTS

A rug hooking workstation constructed according to the preferred teachings of the present invention is shown in the drawings and generally designated 10. The rug hooking workstation 10 includes a framework 12 having a first side 14 and a second side 16. According to the preferred teachings of the present invention, the second side 16 is parallel to the first side 14. According to the preferred teachings of the present invention, the first and second sides 14 and 16 are formed from bent wire and are rectangular in shape and equal in size. A storage area 18 is located between the first side 14 and the second side 16. According to the preferred teachings of the present invention, the first and second sides 14 and 16 are symmetrical about the storage area 18. The first side 14 includes a top 20, a bottom 22, a back 24, and a front 26; and the second side 16 includes a top 21, a bottom 23, a back 25, and a front 27. According to the preferred teachings of the present invention, the framework 12 has a base defined by the bottoms 22 and 23 of the first and second sides 14 and 16. According to the preferred teachings of the present invention, the base is parallel to and spaced from a support surface such as a floor surface.

According to the preferred teachings of the present invention, the workstation 10 has a stabilizer 36 formed of bent wire. The stabilizer 36 is adjacent to the fronts 26 and 27 and bottoms 22 and 23 of the first and second sides 14 and 16 of the framework 12. The stabilizer 36 has an inverted U shape including a central portion 38 formed by two parallel spaced wires each having opposite ends, and a C-shaped foot 40 at each end of the central portion 38 and joined to the ends of the two parallel spaced wires. The central portion 38 extends laterally between, and for a distance beyond, the first and second sides 14 and 16 of the framework 12. Each C-shaped foot 40 includes a spine 42 having opposite ends and a leg 44 on each of the opposite ends of the spine 42. The legs 44 are connected to the two parallel spaced wires of the central portion 38. According to the preferred teachings of the present invention, the spines 42 engage the support surface external to the first and second sides 14 and 16 of the framework 12.

In the preferred embodiments of the present invention, a rolling support 50 is provided adjacent to the backs 24 and 25 and bottoms 22 and 23 of the sides 14 and 16 of the framework 12. In the preferred form shown, the rolling support 50 includes a rectangular bracket 46 formed by parallel spaced wires, extends laterally between, and for a distance beyond, the bottoms 22 and 23 of the sides 14 and 16 of the framework 12, and is located adjacent to the backs 24 and 25 of the sides 14 and 16. On each end of the rectangular bracket 46 and adjacent to the exterior of the framework 12, a mounting plate 48 made of metal is attached to the rectangular bracket 46. To complete the rolling support 50, wheels 52 are mounted to the mounting plates 48 on either side of and external to the first and second sides 14 and 16. According to the preferred teachings of the present invention, the wheels 52 abut the support surface to support the workstation 10. As will be recognized by those skilled in the art, alternate rolling supports, including but not limited to, a single roller, casters, or the like, may be used without departing from the spirit or scope of the present invention.

The stabilizer 36 in conjunction with the support 50 provides rolling support and stability for the workstation 10 while providing mobility. However, according to the teachings of the present invention, framework 12 can be supported and stabilized and mobility can be provided in other manners. As an example, a rolling support 50 can also be provided adjacent the fronts 26 and 27 instead of the stabilizer 36, a stabilizer 36 can also be provided adjacent the backs 24 and 25 instead of the rolling support 50, and other forms of feet or supporting constructions can be provided in conjunction with or instead of rolling support 50 and/or stabilizer 36.

According to the preferred teachings of the present invention, the workstation 10 has a grab bar 56 connected to the first and second sides 14 and 16 of the framework 12 inside of an intersection of a first plane formed by the tops 20 and 21 of the first and second sides 14 and 16 and a second plane formed by the backs 24 and 25 of the first and second sides 14 and 16. In the preferred form, a top plate 34 made of metal is positioned parallel to the support surface and the first plane and is connected laterally between the tops 20 and 21 of the first and second sides 14 and 16 of the framework 12. A back edge 60 of the top plate 34 extends to a location intermediate the backs 24 and 25 and fronts 26 and 27 of the first and second sides 14 and 16 of the framework 12. A gap 58 is defined by the back edge 60 of the top plate 34, the grab bar 56, and the tops 20 and 21 of the sides 14 and 16 of the framework 12. The grab bar 56 defines a handle. The handle enables the rug hooker to tilt the framework 12 rotationally about the rolling support 50 and to pull the framework 12 in a movement direction with the backs 24 and 25 of the first and second sides 14 and 16 located ahead of the fronts 26 and 27 of the first and second sides 14 and 16 in the movement direction.

Figure 1:
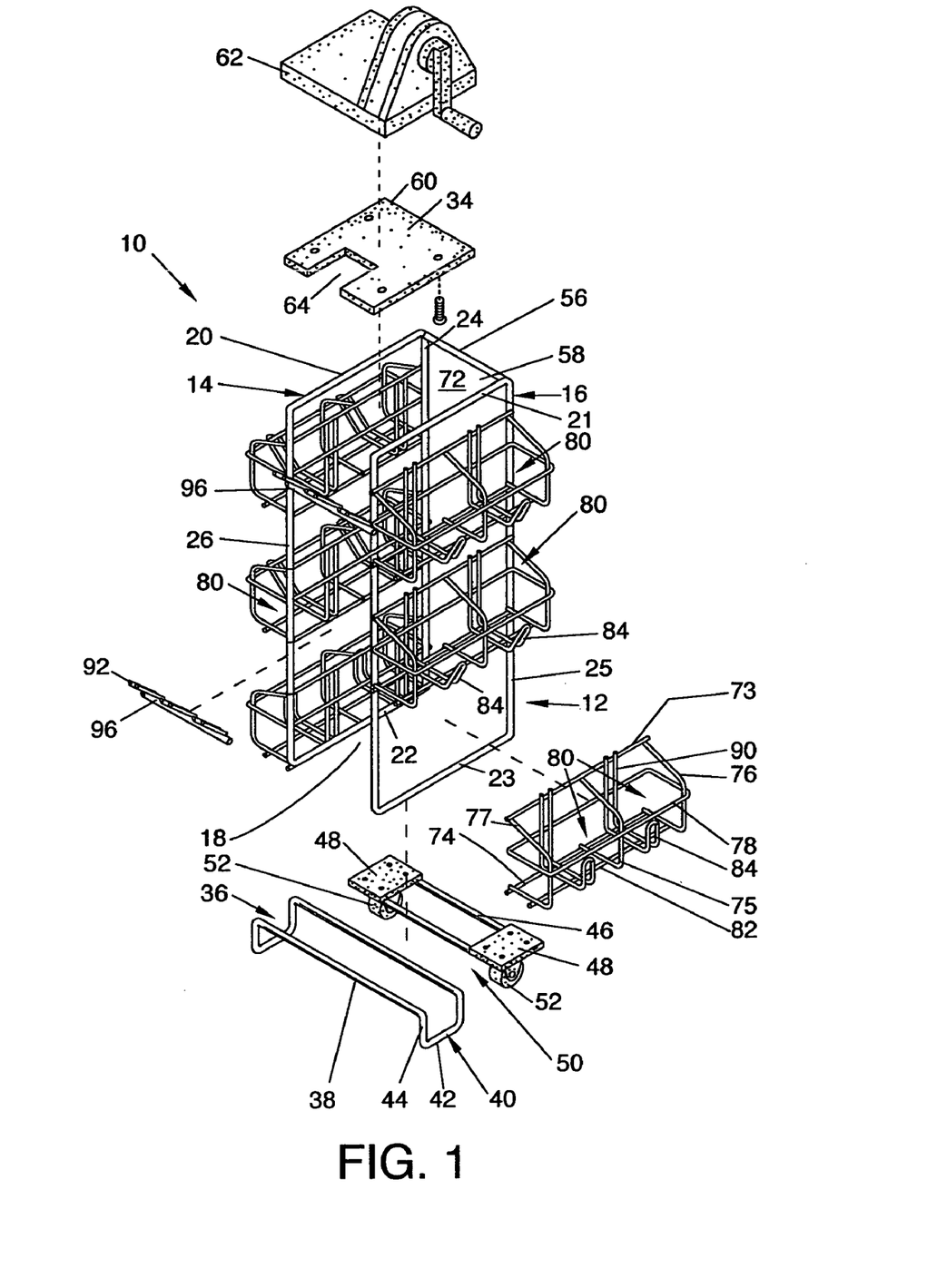
FIG. 1 is an exploded perspective view of a rug hooking workstation according to the preferred teachings of the present invention.
Figure 2:
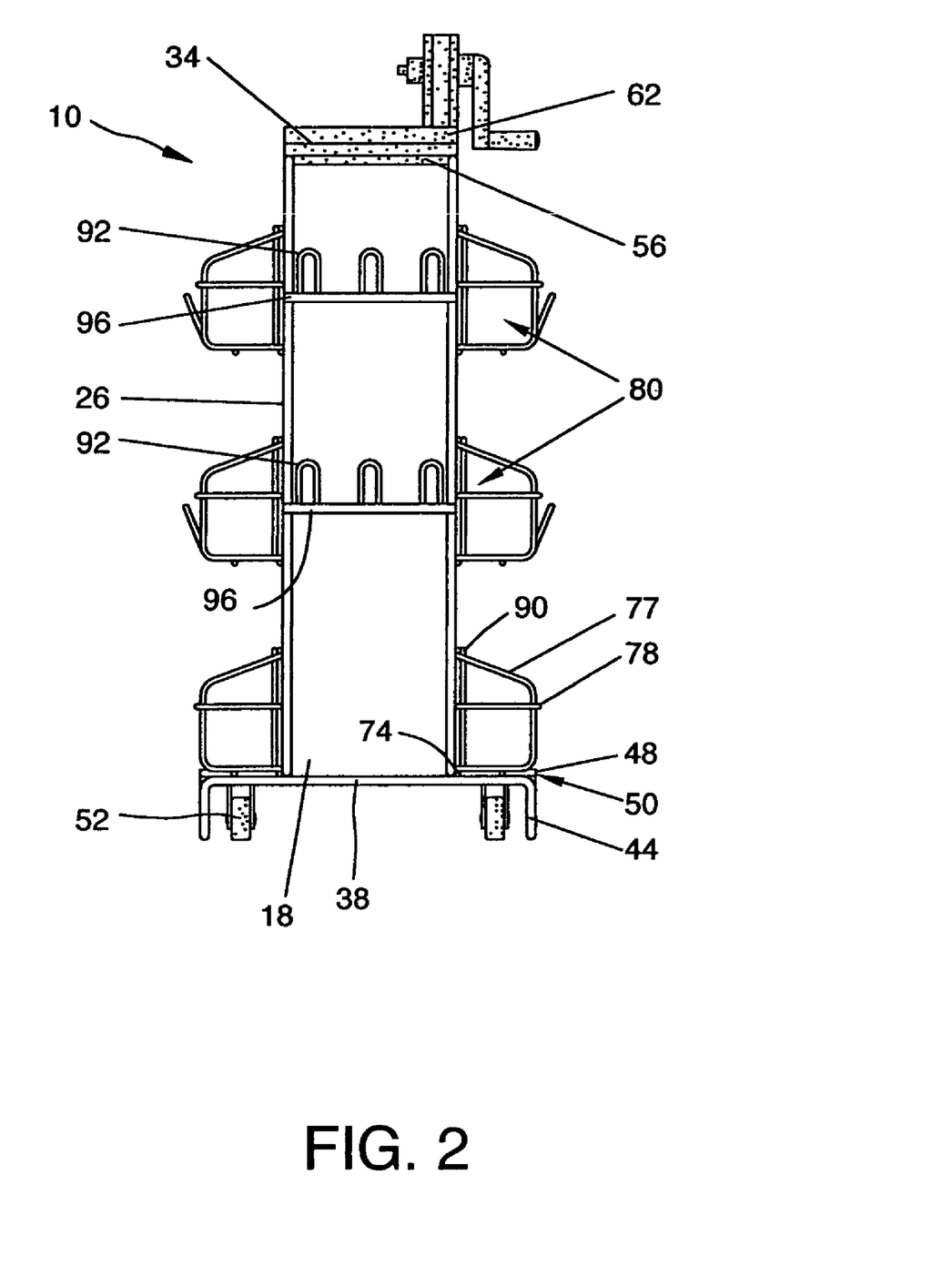
FIG. 2 is a front view of the rug hooking workstation of FIG. 1.
Figure 3:
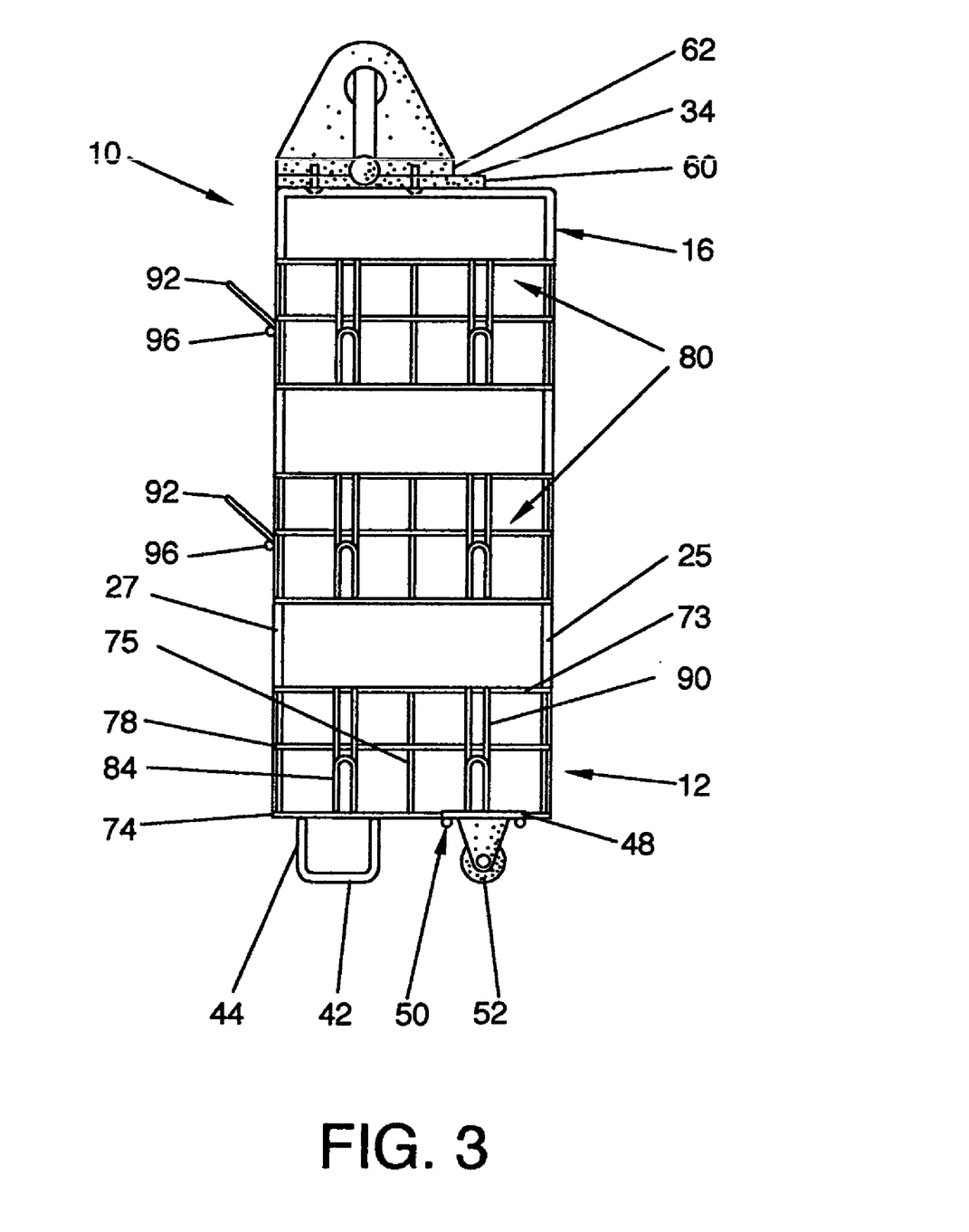
FIG. 3 is a side view of the rug hooking workstation of FIG. 1.
Figure 4:
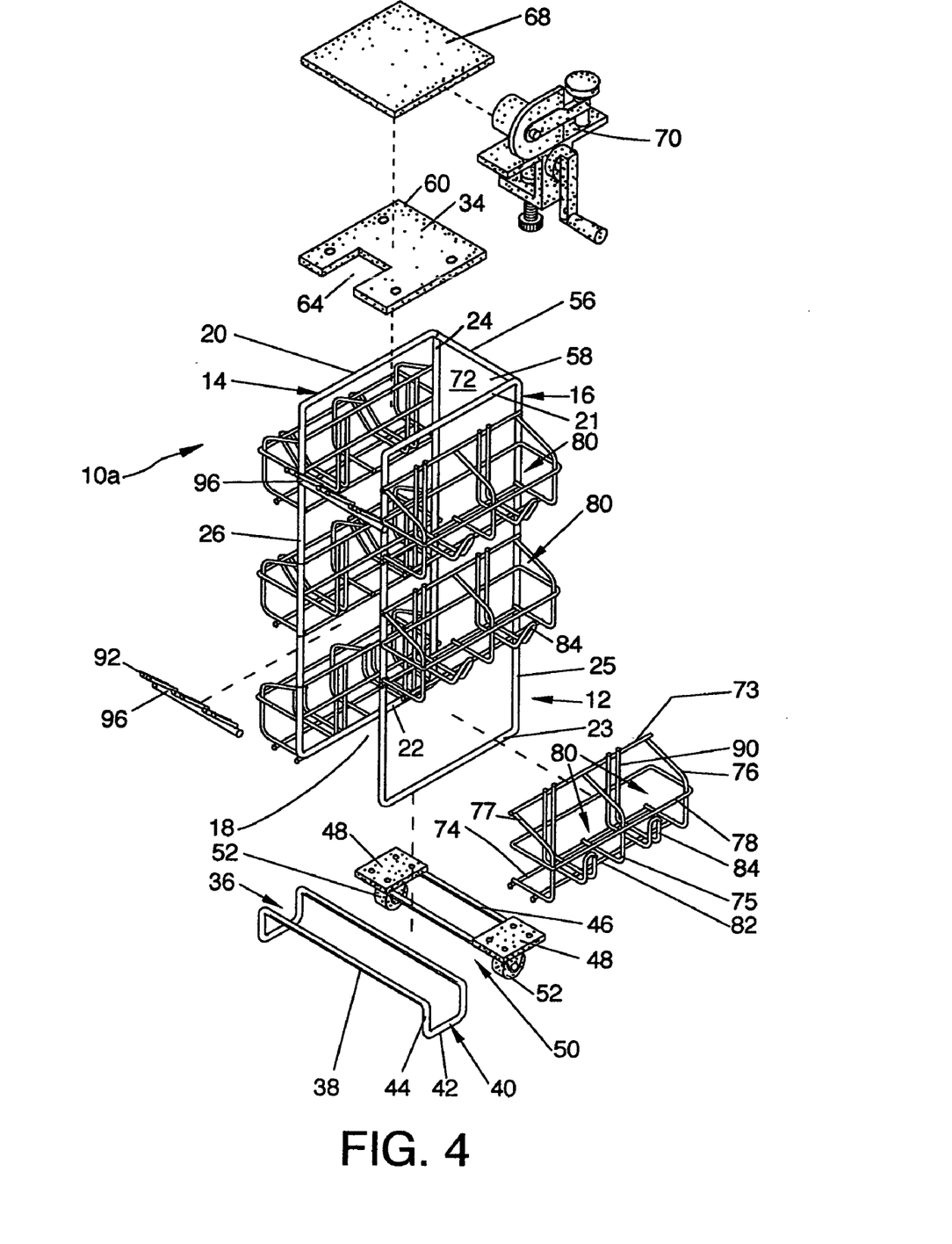
FIG. 4 is an exploded perspective view of a rug hooking workstation of an alternate embodiment according to the preferred teachings of the present invention; and, FIG. 5 is a side view of the alternate rug hooking workstation of FIG. 4.
Figure 5:
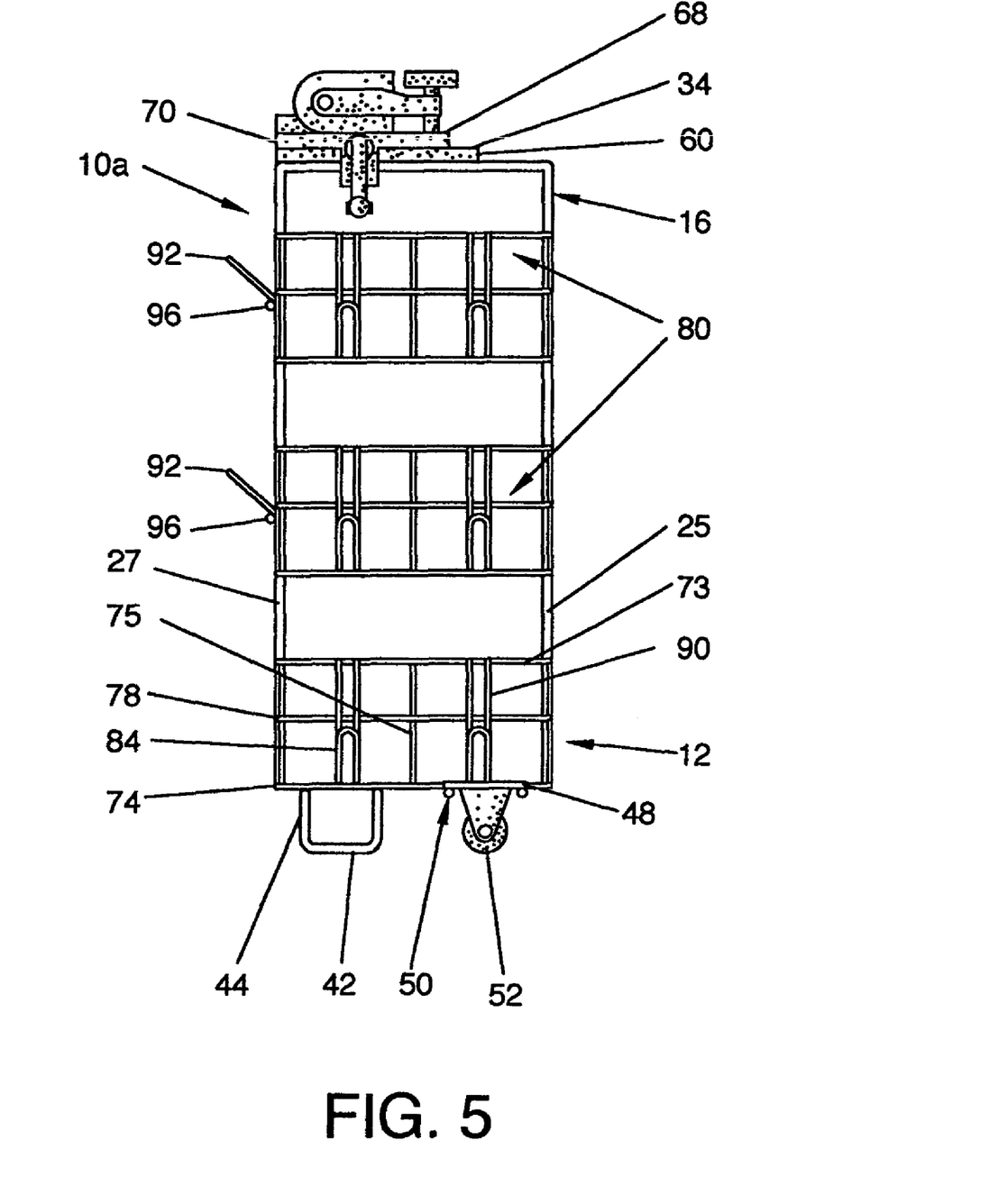

According to the preferred teachings of the present invention, the top plate 34 is adapted to allow the mounting of a bolt-on fabric-cutting device 62. In the preferred form shown, the top plate 34 has a rectangular cutout 64 at an edge opposite the back edge 60 to allow access to an adjusting knob located on the bottom of the bolt-on fabric-cutting device 62. In an alternative form according to the preferred teachings of the present invention and designated 10a in FIGS. 4 and 5, the top plate 34 has a rectangular adapter block 68 to allow for the mounting of a clamp-on fabric-cutting device 70.

The storage area 18 is accessible through an access opening 72 for storing and retrieving the framed rug foundation. According to the preferred teachings of the present invention, the access opening 72 is defined by the backs 24 and 25 of the first and second sides 14 and 16. In the preferred form shown, the access opening 72 is defined by the grab bar 56, the backs 24 and 25 of the first and second sides 14 and 16, and the rectangular bracket 46.

A plurality of bins 80 is attached to the framework 12. The bins 80 store the fabric swatches. According to the preferred teachings of the present invention, the bins 80 are made of bent wire, are formed in pairs, and are attached in sets to the first and second sides 14 and 16 of the framework 12, respectively. In the preferred form shown, the pairs of bins 80 are side-by-side, are oriented horizontal to the support surface and are attached to the framework 12 symmetrically about the storage area 18. The bins 80 can be at different spaces between the tops 20 and 21 and bottoms 22 and 23 of the sides 14 and 16 and external to the storage area 18. In further aspects of the invention, other quantities and locations of the bins 80 may be employed without departing from the spirit or scope of the present invention.

According to the preferred teachings of the present invention, the bins 80 have upper and lower wire mounting bars 73 and 74 to mount the bins 80 to the framework 12. The upper and lower wire mounting bars 73 and 74 extend between and are attached to the backs 24 and 25 and fronts 26 and 27 of the first and second sides 14 and 16 on the exterior of the framework 12. In the most preferred form, the upper and lower wire mounting bars 73 and 74 are configured in parallel. The upper and lower wire mounting bars 73 and 74 can be positioned at different distances from the tops 20 and 21 and the bottoms 22 and 23 of the first and second sides 14 and 16 of the framework 12, and they define the positioning of the bins 80. In the preferred form shown, the bins 80 have elongated U-shaped side members 76 and 77 attached to each end of the upper and lower wire mounting bars 73 and 74. In the preferred form shown, each pair of bins 80 shares a common elongated U-shaped side member 75. In the preferred form shown, the common elongated U-shaped side member 75 is in the center of the upper and lower wire mounting bars 73 and 74. According to the preferred teachings of the present invention, each pair of bins 80 has a containing wire 78 that encircles the pair of bins 80 and is attached to the elongated U-shaped side members 76 and 77. In the preferred form, the containing wire 78 is exterior to the elongated U-shaped side members 75, 76 and 77. According to the preferred teachings of the present invention, each pair of bins 80 also has a wire support 82 located on the bottom that is attached to the elongated U-shaped side members 75, 76 and 77 and spans the width of the pair of bins 80. In the preferred form shown, the wire support 82 is located parallel to and at a distance from the lower wire mounting bar 74. According to the preferred teachings of the present invention, each bin 80 has a J-shaped arm 90 to receive cut fabric strips. In the preferred form shown, the J-shaped arm 90 is formed from parallel bent wires. An upper section of the J-shaped arm 90 is connected to the upper wire mounting bar 74. The lower section of the J-shaped arm 90 shapes the interior of the bin 80 and terminates in a hook 84 of inverted U shape. In this most preferred form, the hook 84 on each of the bins 80 on the upper two rows of bins 80 protrudes outward from the center of the exterior of the bin 80 to provide a hook to hang cut fabric strips. In the preferred form shown, the hooks 84 of the upper rows of bins 80 protrude at an upwardly inclined angle. In the preferred form shown, the hooks 84 of the J-shaped arms 90 on the lower bins 80 do not protrude outward and are flush with the exterior of the lower bins 80. It should be appreciated that such an arrangement creates a clean appearance and provides support and definition to the bins 80 as well as storage for the cut fabric strips proximate to the fabric swatches stored in the plurality of bins 80.

Additional hooks 92 are attached to the framework 12 between the fronts 26 and 27 of the first and second sides 14 and 16 on wire crossbars 96. The hooks 92 are used to hold cut fabric strips. According to the preferred teachings of the present invention, the hooks 92 are formed of wire of an inverted U-shape. The wire crossbars 96 extend between and are attached to the fronts 26 and 27 of the first and second sides 14 and 16 of the framework 12. In the preferred form shown, the hooks 92 protrude at an upwardly inclined angle exterior to the storage area 18 and provide storage for the cut fabric strips in a readily visible and accessible manner.

In the most preferred form of the invention, the workstation 10 has bins 80 to provide readily accessible and visible storage of the fabric swatches in proximity to the fabric-cutting device 62 or 70. The workstation 10 has a plurality of hooks 84 and a plurality of hooks 92 on which to hold the cut fabric strips in proximity to the fabric-cutting device 62 or 70 and also in proximity to the fabric swatches stored in the bins 80, to provide orderliness and efficiency to the rug hooker's craft.

Now that the basic teachings of the present invention have been explained, many extensions and variations will be obvious to one having ordinary skill in the art. For example, although workstation 10 according to the preferred teachings of the present invention has been shown as including several features in a combination believed to produce synergistic results, such features can be utilized singly and in other combinations with other features according to the teachings of the present invention.

Furthermore, although the framework 12 shown in the most preferred form includes the first side 14 and the second side 16 being parallel, rectangular in shape, and equal in size, it can be appreciated that the first and second sides 14 and 16 could be of different forms, sizes, shapes and orientations than as shown and still be within the teachings of the present invention.

Additionally, although the handle formed by the grab bar 56 of the preferred form is advantageous and is believed to produce synergistic results with the rolling support 50 of the most preferred form, according to the teachings of the present invention a handle could be of different form, shape, and orientation, and could be at other locations. Further, grasping of framework 12 for mobility reasons could be performed in other manners according to the teachings of the present invention.

Similarly, while formed of bent wire, which is believed to be advantageous for many reasons, including being inexpensive to purchase, manufacture, and assemble, strong, lightweight, and aesthetically pleasing, framework 12, bins 80, and hooks 84 and 92 could be formed from other material according to the teachings of the present invention.

Thus, since the invention disclosed herein may be embodied in other specific forms without departing from the spirit of general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

Various modifications can be made to the present invention without departing from the apparent scope thereof.

It is claimed:

1. A workstation to facilitate hooking of rugs and for storage of rug hooking fabric swatches, cut fabric strips, a fabric-cutting device, and a framed rug foundation, comprising, in combination:
    a. a framework having a first side and a second side establishing a storage area for a framed rug foundation, the storage area being located between the first side and the second side, and each of the first side and the second side including a top, a bottom, a front and a back;
    b. a first set of bins attached to the framework on the first side and external to the storage area;
    c. a second set of bins attached to the framework on the second side and external to the storage area, the storage area being intermediate the first set of bins and the second set of bins;
    d. a first hook attached to one of the bins, the first hook protruding at an upwardly inclined angle external to the one bin for holding cut fabric strips;
    e. a set of hooks attached to the framework, the set of hooks being exterior to the storage area and being for holding cut fabric strips in a readily visible and accessible manner;
    f. a rolling support adjacent to the backs and bottoms of the first and second sides of the framework, the rolling support providing for mobility on a support surface;
    g. a stabilizer adjacent to the fronts and bottoms of the first side and the second side of the framework, the stabilizer having an inverted U shape, the inverted U shape including a central portion having opposite ends and a C-shaped foot extending from each of the opposite ends of the central portion, the central portion extending laterally between, and for a distance beyond, the first side and the second side of the framework, each C-shaped foot including a spine having opposite ends and a leg on each of the opposite ends of the spine, the legs being connected to the central portion and the spines being for engaging the support surface external to the first side and the second side of the framework;
    h. a grab bar extending laterally between the first side and the second side of the framework to an intersection of a first plane formed by the tops of the first side and the second side and a second plane formed by the backs of the first side and the second side, the grab bar being connected to the first side and the second side of the framework; and,
    i. a top plate connected laterally between the tops of the first side and the second side of the framework and parallel to the first plane, the top plate having a back edge extending to a position intermediate the fronts and backs of the first side and the second side of the framework and forming a gap adjacent to the grab bar to define a handle, the handle enabling the framework to be tilted rotationally about the rolling support and pulled in a movement direction, with the backs of the first side and the second side located ahead of the fronts of the first side and the second side in the movement direction, the top plate being adapted to allow the mounting of a fabric-cutting device, the top plate having a cutout on the edge opposite the back edge for providing access for adjusting the fabric-cutting device, the grab bar and the backs of the first side and the second side defining an access opening to the storage area located between the first side and the second side, the storage area being accessible through the access opening for storing and retrieving a framed rug foundation, the first and second sets of bins being usable for readily accessible and visible storage of fabric swatches in proximity to the fabric-cutting device, and the hooks being usable for holding cut fabric strips in proximity to the fabric-cutting device and in proximity to fabric swatches when stored in the first and second sets of bins for providing orderliness.

2. The workstation of claim 1 further comprising a second hook attached to another of the bins for providing external storage for cut fabric strips, the one bin being attached to the first side of the framework and the another bin being attached to the second side of the framework.

3. The workstation of claim 1, wherein the rolling support is formed by a rectangular bracket, the rectangular bracket being formed by parallel spaced wires and extending laterally between, and for a distance beyond, the bottoms of the first and second sides of the framework and being located adjacent to the backs of the first and second sides of the framework, the rectangular bracket having ends with a mounting plate attached to each end adjacent and exterior to the framework, and a wheel being mounted to each of the mounting plates external to the first side and the second side of the framework, the wheels being for abutting a support surface.

4. The workstation of claim 1, wherein the set of hooks is attached to a crossbar which is attached to the fronts of the first side and the second side of the framework.

5. The workstation of claim 1, wherein the framework is formed of wire and has a base defined by the bottoms of the first side and the second side, the first side and the second side each being rectangular and parallel to one another, and the top plate being parallel to the base.

6. The workstation of claim 1, wherein the top plate has an adapter block to allow the mounting of a fabric-cutting device of a clamping type.

7. A workstation to facilitate hooking of rugs and for storage of rug hooking fabric swatches, cut fabric strips, a fabric-cutting device, and a framed rug foundation, comprising, in combination:

a. a framework having a first side and a second side establishing a storage area for a framed rug foundation, the storage area being located between the first side and the second side, and each of the first side and the second side including a top, a bottom, a front and a back;
b. a plurality of bins attached to the framework for use in holding fabric swatches;
c. a first hook attached to one of the plurality of bins, the first hook being for holding cut fabric strips;
d. a plurality of hooks attached to the framework, the plurality of hooks being for holding cut fabric strips;
e. a rolling support adjacent to the backs and bottoms of the first side and the second side of the framework, the rolling support providing for mobility on a support surface;
f. a stabilizer adjacent to the fronts and bottoms of the first side and the second side of the framework, the stabilizer having an inverted U shape, the inverted U shape including a central portion having opposite ends and a C-shaped foot extending from each of the opposite ends of the central portion, the central portion extending laterally between, and for a distance beyond, the first side and the second side of the framework, each C-shaped foot including a spine having opposite ends and a leg on each of the opposite ends of the spine, the legs being connected to the central portion and the spine being for engaging the support surface external to the first side and the second side of the framework;
g. a grab bar extending laterally between the first side and the second side of the framework to an intersection of a first plane formed by the tops of the first side and the second side and a second plane formed by the backs of the first side and the second side, the grab bar being connected to the first side and the second side of the framework; and,
h. a top plate connected laterally between the tops of the first side and the second side of the framework and parallel to the first plane, the top plate having a back edge extending to a position intermediate the fronts and backs of the first side and the second side of the framework and forming a gap adjacent to the grab bar to define a handle, the handle enabling the framework to be tilted rotationally about the rolling support and pulled in a movement direction, with the backs of the first side and the second side located ahead of the fronts of the first side and the second side in the movement direction, and the top plate being adapted to allow the mounting of a fabric-cutting device.

8. The workstation of claim 7 further comprising a second hook attached to another of the plurality of bins for providing external storage for cut fabric strips, the one of the plurality of bins being attached to the first side of the framework and the another of the plurality of bins being attached to the second side of the framework.

9. The workstation of claim 7, wherein the rolling support is formed by a rectangular bracket, the rectangular bracket being formed by parallel spaced wires and extending laterally between, and for a distance beyond, the bottoms of the first and second sides of the framework and being located adjacent to the backs of the first and second sides of the framework, the rectangular bracket having ends with a mounting plate attached to each end adjacent and exterior to the framework, and a wheel being mounted to each of the mounting plates external to the first side and the second side of the framework, the wheels being for abutting a support surface.

10. The workstation of claim 7, wherein the plurality of hooks are attached to a crossbar which is attached to the fronts of the first side and the second side of the framework.

11. The workstation of claim 7, wherein the first hook is formed by a J-shaped arm, the J-shaped arm being formed of parallel bent wires and having an upper section connected to a mounting bar, the mounting bar being attached to the framework, and the J-shaped arm also having a lower section, the lower section shaping an interior of the one bin and terminating in an inverted U shape protruding outward from the one bin for use in hanging cut fabric strips.

12. The workstation of claim 11, wherein the framework is formed of wire and has a base defined by the bottoms of the first side and the second side, the first side and the second side each being rectangular and parallel to one another and the top plate being parallel to the base.

13. The workstation of claim 7, wherein the top plate has an adapter block to allow the mounting of a fabric-cutting device of a clamping type.

14. The workstation of claim 7, wherein the framework is formed of wire and has a base defined by the bottoms of the first side and the second side, the first side and the second side each being rectangular and parallel to one another and the top plate being parallel to the base.

15. The workstation of claim 7, wherein the top plate has a cutout on the edge opposite the back edge for providing access for adjusting the fabric-cutting device.

* * * * *